Dec. 28, 1926.

Y. TOKUNAGA

ROTATING TUBE MECHANISM FOR GLASS FEEDERS

Filed Jan. 26, 1926

Inventor
Yoshijiro Tokunaga
by Robson D Brown
Attorney.

Patented Dec. 28, 1926.

1,612,756

UNITED STATES PATENT OFFICE.

YOSHIJIRO TOKUNAGA, OF OSAKA, JAPAN, ASSIGNOR TO HARTFORD-EMPIRE COMPANY, OF HARTFORD, CONNECTICUT, A CORPORATION OF DELAWARE.

ROTATING TUBE MECHANISM FOR GLASS FEEDERS.

Application filed January 26, 1926, Serial No. 83,821, and in Japan April 9, 1925.

My invention relates to glass feeding apparatus in which a container for molten glass, such as a forehearth connected to a tank furnace, is provided with a discharge outlet in its bottom, and in which a vertical tube is arranged above the discharge outlet to regulate the quantity of glass admitted to the outlet, this tube enclosing a vertically reciprocating plunger which controls the periodic discharge of the glass.

The object of my invention is to provide a simple and effective arrangement for supporting and rotating the vertical tube referred to above, to the end that the glass may be given a rotary stirring movement by the rotation of the tube, thus commingling the glass and rendering it uniform in temperature and consistency when delivered through the outlet.

The invention will be explained by reference to the accompanying drawing, in which similar numerals refer to similar parts, and in which—

Figure 1:
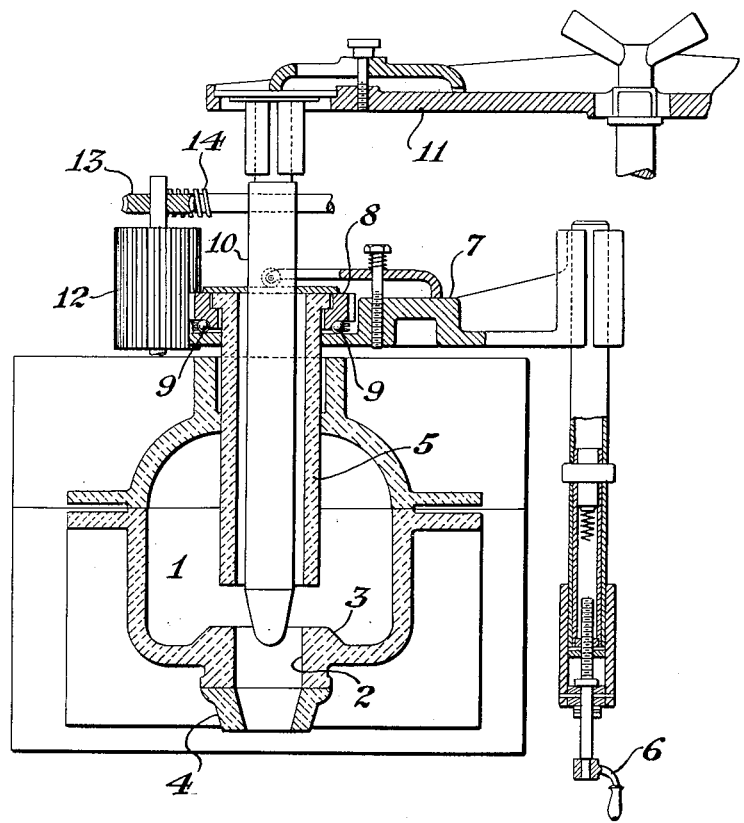
Figure 2:
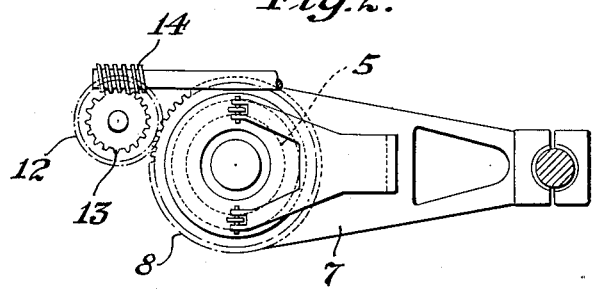

Figure 1 is a vertical sectional view of an apparatus constructed in accordance with my invention, and Fig. 2 is a plan view of a part of the mechanism shown in Fig. 1.

In the drawing, the numeral 1 indicates a container for molten glass, here shown as a forehearth connected to a glass furnace. A discharge outlet 2 is provided in the bottom 3 of the forehearth 1, and an orifice ring 4 is disposed below and in line with the outlet 2. Above the outlet is a plunger 11 that is suspended and reciprocated vertically by an arm 10 which may be moved up and down by any desired means, not shown.

A vertically adjustable and rotatable tube 5 surrounds the plunger 11 and is removably suspended from an arm 7 which may be adjusted vertically by means of a handle 6 and suitable screw mechanism, as shown. The enlarged upper end of the tube 5 is seated in a spur gear ring 8 which rests upon suitable antifriction bearings indicated by the balls 9.

The gear ring 8 meshes with an elongated spur gear 12 mounted on a vertical shaft which also carries a worm wheel 13 meshing with a driving worm 14. By this arrangement of gearing, the tube may be rotated either intermittently or constantly. It is preferably rotated constantly.

For the purpose of holding the tube assembly upon its bearing, I provide a bifurcated member 15, the outer curved end 16 of which rests upon the arm 7. The two arms of the bifurcated portion of the member 15 carry rollers 17 which rest upon an annular plate 18 on the top of the tube 5. A screw 19 extends through the member 15 and through a threaded opening in the arm 7, and a spring 20 surrounds the screw 19 to press the member 15 down with a pressure which may be regulated by turning the screw 19.

In the operation of the apparatus described above, molten glass flows from the tank into the forehearth 1 and thence under the tube 3 to the outlet 2, where it is discharged periodically under the control of the plunger 10. The tube 5 is rotated at suitable speed to impart a circular motion to the glass in the forehearth, which mixes the glass and insures that the glass in the forehearth on all sides of the tube and the plunger is at the same temperature. Consequently, the glass discharged from the outlet is uniform in temperature and consistency. Without such mixing action, the glass at the side of the tube opposite to the heating burners tends to become cooled by the masking or shadowing effect of the tube.

The mechanism described above for supporting the tube and holding it removably in position is of simple construction, and provides for the free rotation of the tube, and for readily replacing the tube, without requiring a complicated bearing structure.

I claim as my invention:

1. In glass feeding apparatus, the combination, with a container for molten glass having a discharge outlet and having a regulating tube disposed above said outlet, of a support for said tube, and means for removably mounting said tube on said support, comprising a member arranged to exert downward pressure on said tube.

2. In glass feeding apparatus, the combination, with a container for molten glass having a discharge outlet and having a regulating tube disposed above said outlet, of a support for said tube and means for removably mounting said tube on said support, comprising a member arranged to exe downward pressure on said tube, and means for regulating the amount of such pressure.

3. In glass feeding apparatus, the combination, with a container for molten glass having a discharge outlet and having a regulating tube disposed above said outlet, of a support for said tube and means for removably mounting said tube on said support, comprising a member resting upon said support and also upon the upper end of said tube, and means for regulating the pressure of said member upon said tube.

4. In glass feeding apparatus, the combination, with a container for molten glass having a discharge outlet and having a regulating tube disposed above said outlet, of a support for said tube and means for removably mounting said tube on said support, comprising a member resting upon said support and also upon the upper end of said tube, a screw extending through said member and into said support, and a spring surrounding said screw between said member and the head of said screw.

5. In glass feeding apparatus, the combination, with a container for molten glass having a discharge outlet and having a regulating tube disposed above said outlet, of a support for said tube and means for removably and rotatably mounting said tube on said support comprising an antifriction bearing surrounding said tube, a member resting upon said support and upon the upper end of said tube, and means for regulating the pressure of said member upon said tube.

6. In glass feeding apparatus, the combination, with a container for molten glass having a discharge outlet and having a regulating tube disposed above said outlet, of a support for said tube and means for removably and rotatably mounting said tube on said support comprising an antifriction bearing surrounding said tube, a member having one end resting on said support and having its other end bifurcated and carrying rollers resting upon the upper end of said tube, and a spring for regulating the downward pressure of said rollers upon said tube.

7. In glass feeding apparatus, the combination, with a container for molten glass having a discharge outlet and having a regulating tube disposed above said outlet, of a support for said tube and means for removably and rotatably mounting said tube on said support comprising an annular antifriction bearing carried by said support and surrounding said tube near its upper end, an annular plate carried by the upper end of said tube, a member having one end resting upon said support and having its other end bifurcated and provided with rollers resting upon said plate, a screw extending through said member and into a threaded opening in said support, and a spring surrounding said screw between said member and the head of said screw.

8. In glass feeding apparatus, the combination, with a container for molten glass having a discharge outlet and having a regulating tube disposed above said outlet, of a support for said tube and means for rotating said tube comprising a gear ring surrounding the upper end of said tube, an elongated gear meshing with said gear ring and rotatable on a vertical shaft, a worm wheel carried by said shaft, and a driving worm meshing with said worm wheel.

Signed at Kobe, Japan, this 18th day of March, 1926.

YOSHIJIRO TOKUNAGA.